US009898032B2

(12) United States Patent
Hafez et al.

(10) Patent No.: US 9,898,032 B2
(45) Date of Patent: Feb. 20, 2018

(54) FLUID HAPTIC INTERFACE WITH IMPROVED HAPTIC RENDERING USING A TORQUE OR LOAD SENSOR

(71) Applicant: COMMISSARIAT A L'ENERGIE ATOMIQUE ET AUX ENERGIES ALTERNATIVES, Paris (FR)

(72) Inventors: Moustapha Hafez, Palaiseau (FR); Jose Lozada, Palaiseau (FR); Laurent Eck, Palaiseau (FR); Gwenael Changeon, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/514,568

(22) PCT Filed: Sep. 29, 2015

(86) PCT No.: PCT/EP2015/072316
§ 371 (c)(1),
(2) Date: Mar. 27, 2017

(87) PCT Pub. No.: WO2016/050717
PCT Pub. Date: Apr. 7, 2016

(65) Prior Publication Data
US 2017/0227980 A1    Aug. 10, 2017

(30) Foreign Application Priority Data

Sep. 29, 2014   (FR) .................................... 14 59187

(51) Int. Cl.
*G08B 21/00*  (2006.01)
*G05G 5/03*   (2008.04)
(Continued)

(52) U.S. Cl.
CPC ............... *G05G 5/03* (2013.01); *F16F 9/535* (2013.01); *G05G 1/02* (2013.01); *G05G 1/08* (2013.01); *G05G 2505/00* (2013.01); *G08B 6/00* (2013.01)

(58) Field of Classification Search
CPC ....................................................... G05G 5/03
(Continued)

(56) References Cited

U.S. PATENT DOCUMENTS 5,555,894 A    9/1996  Doyama et al.
5,778,885 A    7/1998  Doyama et al.
(Continued)

FOREIGN PATENT DOCUMENTS

FR    2 930 655 A1    10/2009
WO    2013/157205 A2   10/2013
WO    2015/033034 A1    3/2015

OTHER PUBLICATIONS

International Search Report dated Dec. 8, 2015 in PCT/EP2015/072316 filed Sep. 29, 2015.
(Continued)

*Primary Examiner* — Jeffery Hofsass
(74) *Attorney, Agent, or Firm* — Oblon, McClelland, Maier & Neustadt, L.L.P.

(57) ABSTRACT

A haptic interface, including: a button which can be rotated by a user; an interaction element interacting with a magnetorheological fluid, secured to the button; a mechanism measuring a current position of the button; a brake including a magnetorheological fluid and a generation system to generate a magnetic field in the fluid; a controller configured to generate orders for the system to generate a magnetic fluid to modify a value of the magnetic field; and a mechanism to detect torque exerted by a user on the button to know direction of the torque and whether the torque is greater than
(Continued)

a given value for a given direction, the controller controlling generation of a magnetic field based on obtained information about the torque at least when the button indicates zero or low speed.

17 Claims, 6 Drawing Sheets

(51) Int. Cl.
      *G05G 1/08*       (2006.01)
      *F16F 9/53*       (2006.01)
      *G05G 1/02*       (2006.01)
      *G08B 6/00*       (2006.01)

(58) Field of Classification Search
      USPC .......................................... 340/407.1, 407.2
      See application file for complete search history.

(56) References Cited

U.S. PATENT DOCUMENTS

| | | |
|---|---|---|
| 2002/0057152 A1 | 5/2002 | Elferich et al. |
| 2006/0280575 A1 | 12/2006 | Ruettiger |
| 2007/0279401 A1 | 12/2007 | Ramstein et al. |
| 2011/0181405 A1 | 7/2011 | Periquet et al. |
| 2012/0267221 A1 | 10/2012 | Gohng et al. |
| 2015/0097774 A1 | 4/2015 | Kabasawa et al. |

OTHER PUBLICATIONS

French Search Report dated Jun. 17, 2015 in FR 1459187 filed Sep. 29, 2014.
U.S. Appl. No. 14/407,302, filed Dec. 11, 2014, US 2015/0162853 A1, Edouard Leroy et al.
U.S. Appl. No. 14/408,771, filed Dec. 17, 2014, US 2015/03101553 A1, Carlos Rossa et al.

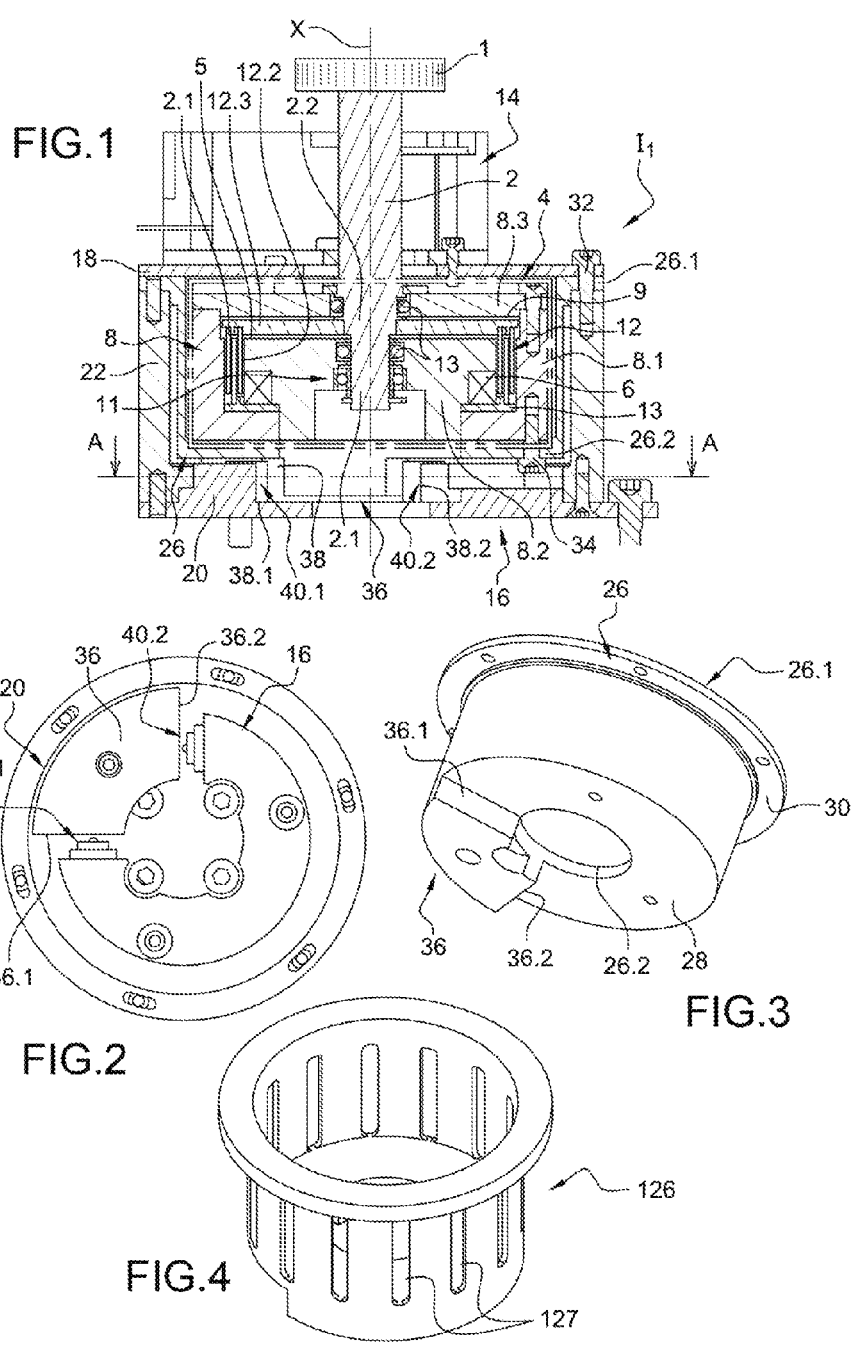

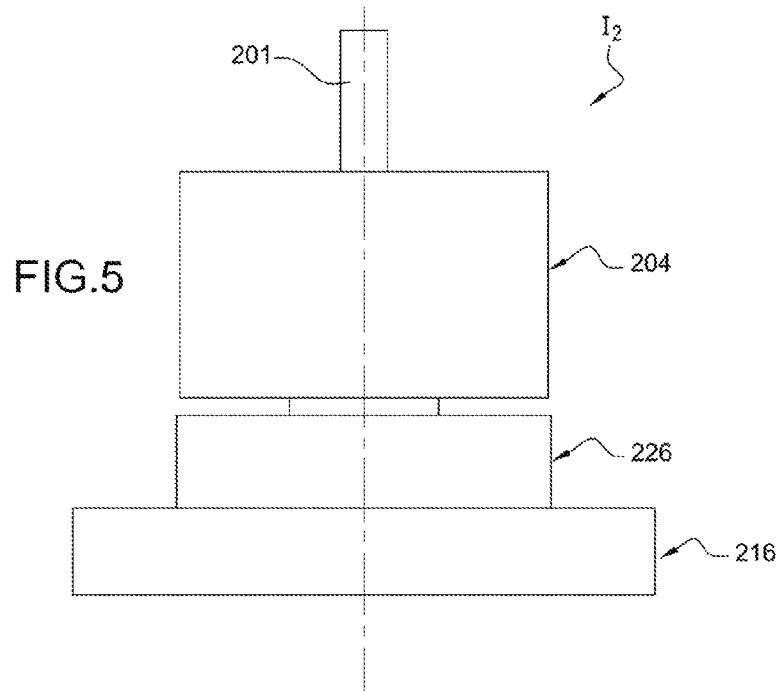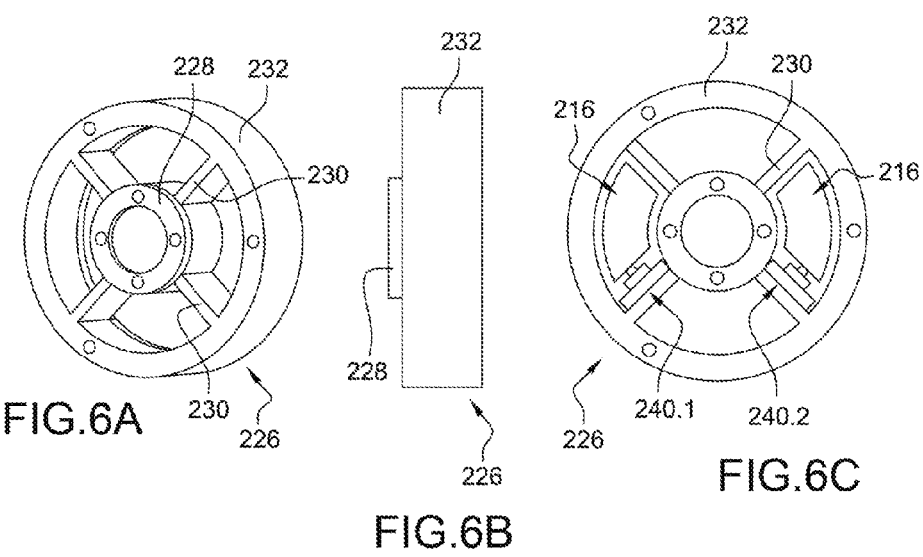

FLUID HAPTIC INTERFACE WITH IMPROVED HAPTIC RENDERING USING A TORQUE OR LOAD SENSOR

FIELD OF THE INVENTION AND STATE OF THE RELATED ART

The present invention relates to a haptic interface with improved haptic rendering.

A haptic interface can take the form of a rotary button operated by a user, in this case, the interface opposes a torque resisting the user according to the angular position of the actuation button and the movement applied by the user, thus making it possible to define haptic patterns which will be perceived by the user when turning the button.

The resistant torque can be transmitted to the button via a magnetorheological fluid, the apparent viscosity whereof is modified by applying a magnetic field in order to define the predefined haptic patterns. In this configuration where the haptic sensation is an angular function of the position of the button, the production of certain haptic patterns is tainted with undesirable effects which impair the perceived haptic quality.

For example in the case where the interface is to reproduce a stop, it is necessary to generate a significant resistant torque when the button enters the angular zone defined as a haptic stop. When the system is in this configuration, it is locked in this stable state. The user must then apply a load to turn the button in the opposite direction, perceives a sticking sensation and thus must "unstick" from the stop until he/she comes out of the angular zone defined as a haptic stop.

The document US2006/0280575 describes an example of a haptic interface with magnetorheological fluid wherein a spring is provided in the rotary shaft of the interface, which introduces a relative motion between the button and the element in contact with the magnetorheological fluid. As such, when the user moves the button in the opposite direction when at a stop, the relative motion caused by the spring enables a movement of the shaft which can then be detected by the angular position sensor thereof. However, the choice of the spring stiffness is complex; indeed, if the spring is too stiff, the user must apply a significant load to oppose the stiffness of the spring until a resulting movement detectable by the angular position is generated. Conversely, if the spring stiffness is too low, the user will perceive the stiffness thereof instead of perceiving a stop (theoretically infinite stiffness), the stop sensation produced is then not of good quality.

More generally, the simulation of a sensation when the haptic pattern in one direction is different to the haptic pattern in the opposite direction can generate this sticking sensation which impedes the satisfactory haptic rendering of the interface.

Reproducing a haptic pattern, for example a stop, also involves the drawback of requiring continuous electricity consumption, due to the power supply of the coil to create the magnetic field modifying the apparent viscosity in order to generate the haptic pattern sought, even if the user has released the button, since the fact that the user has released the button is not detected.

DESCRIPTION OF THE INVENTION

Consequently, one aim of the present invention is that of offering a haptic interface offering improved haptic rendering, particularly in the case where the haptic pattern varies between a first movement direction and a second direction opposite the first movement direction, for example in the case of reproducing a stop.

The aim described above is achieved by a haptic interface comprising a member for interacting with the user and a member for interacting with a fluid, the viscosity whereof varies according to a control stimulus, the two members being secured at least in rotation or at least in translation, means for generating a variable stimulus, a sensor for measuring the current position of the element for interacting with the user, and means for detecting the user's intended action before the motion applied to the element for interacting with the user becomes perceptible for the user and for the position measurement sensor in order to determine the direction of movement that the user intends to apply to the element for interacting with the user.

By means of the invention, knowledge is obtained as early as possible of the direction wherein the element for interacting with the user is to move, making it possible to control the means for generating a magnetic field accordingly. In the case where the element for interacting with the user is in a stop zone and the direction of movement sought by the user corresponds to that of the stop, the magnetic field is maintained or reapplied. If the direction of movement sought by the user is such that the button leaves the stop zone, the magnetic field is reduced or suppressed.

It should be noted that a position sensor is not sufficiently sensitive to detect the user's intention.

The invention makes it possible to reduce, or even suppress, a spatial and time delay in the control of the interface by anticipating the user's movement action.

In the case of a magnetorheological fluid, the electricity consumption can be reduced since it is possible to determine whether the user holds an action or not on the interface by means of the invention, it is no longer necessary to apply a continuous magnetic field. The same advantage exists when an electrorheological fluid is used.

The user's intention is detected by estimating the force applied to the element for interacting with the user by means of the strain of an element of the interface. For example in the case of a rotary haptic interface, a torsional torque can be detected on the rotary shaft connecting the interaction elements, on the element for interacting with the fluid or more advantageously by means of an additional part connected both to the elements reproducing the haptic patterns and to the frame and the strain whereof is measured. The strain is for example detected by one or more load sensors suitable for determining the direction of the torque applied to the haptic interface and whether the torsional torque applied exceeds a given threshold beyond which the user is considered to effectively intend to operate the haptic interface.

The combined processing of the information from the current position sensor and the means for determining the user's intention makes it possible to apply a haptic pattern which is dependent on the direction of the user's intended action, when there is no movement, or on the sign of the rotational speed, when there is movement. Such management of the haptic patterns makes it possible to associate same with a preferred direction of movement of the element for interacting with the user of the button without the user perceiving a significant parasitic load when changing direction.

Very advantageously, the interface can comprise means suitable for modulating the variable stimulus applied to the fluid according to the current position of the element for interacting with the user and the actuation speed of the element for interacting with the user. By applying a haptic pattern which is dependent on the actuation speed of the element for interacting with the user, it is possible to modulate, for example accentuate the haptic sensation according to the actuation speed of the element for interacting with the user. This modulation can relate to modifications of amplitude or shape of the pattern. As such, accounting for the actuation speed in the selection of the haptic pattern value, the control of the haptic sensation is improved. For example, a decrease in the haptic sensation when the actuation speed is high is prevented.

The subject-matter of the present invention thus is a haptic interface comprising:
- an element for interacting with a user suitable for moving in a first direction and in a second direction,
- an element for interacting with a fluid, the viscosity whereof varies according to an external stimulus, the element for interacting with the fluid being secured at least in translation or at least in rotation with the element for interacting with the user,
- means for measuring a current position of the element for interacting with the user,
- a brake comprising a fluid, the viscosity whereof varies according to an external stimulus, and a system for generating said stimulus on command in said fluid, the element for interacting with the fluid being arranged in the fluid,
- a control unit suitable for generating orders to said system for generating said stimulus to modify the stimulus value, and
- means for detecting the torque applied by a user to the element for interacting with the user, in the case of a rotatable element for interacting with the user, in order to determine the direction of the torque and whether the torque is greater than a given value for a given direction, the control unit controlling the system for generating said stimulus on the basis of the information obtained on the torque at least when a zero or low speed of the element for interacting with the user is detected, or
- means for detecting the load applied by a user to the element for interacting with the user, in the case of a translatable element for interacting with the user, in order to determine the direction of the force and whether the force is greater than a given value for a given direction, the control unit controlling the system for generating said stimulus on the basis of the information obtained on the force at least when a zero or low speed of the element for interacting with the user is detected.

In one example of an embodiment, the means for detecting the torque or force applied by the user to the element for interacting with the user comprise at least one load sensor, preferentially mounted pre-stressed. Preferably, the means for detecting the torque or force applied by the user to the element for interacting with the user comprise two load sensors, arranged such that one load sensor detects a load when the torque or force is applied in the first direction and the other load sensor detects a load when the torque or force is applied in the second direction.

In a further example of an embodiment, the means for detecting the torque or force applied by the user to the element for interacting with the user comprise at least one sensor of the strain induced by the torque or force to one of the elements of the haptic interface. Preferably, the means for detecting the torque or force applied by the user to the element for interacting with the user comprise two sensors of the strain induced by the torque or force to one of the elements of the haptic interface, said strain sensors being arranged such that one strain sensor detects the strain when the torque or force is applied in the first direction and the other strain sensor detects a strain when the torque or force is applied in the second direction.

For example, the haptic interface can comprise a proof body which is arranged so as to be strained by the torque or force applied by the user to the element for interacting with the user, the means for detecting the torque or force being in contact with said proof body.

Preferably, the proof body is made of a material such that the strain thereof is not perceptible by the user.

The load sensor(s) can be in point contact with the proof body.

The haptic interface can comprise a frame whereon are mounted means for detecting the torque or force, the proof body being on one hand secured to the brake and on the other secured to the frame so as to be strained when a torque or force is applied to the element for interacting with the user.

The load sensor(s) or the strain sensor(s) are advantageously arranged with respect to the proof body such that the measurement sensitivity of the load sensors with respect to the torque or the force is maximised.

In one example of an embodiment, the element for interacting with the user is rotatable and is secured to a rotary shaft the longitudinal axis whereof the element for interacting with the fluid is secured in rotation, the rotational torque being determined. The brake can then comprise a cylindrical housing having a circular cross-section coaxial with the axis of the rotary shaft, the proof body being cylindrical with a coaxial circular cross-section and arranged coaxially about the housing and wherein the load sensor(s) or the strain sensor(s) are arranged on a circle centred on the axis of rotation of the rotary shaft.

In a further example of an embodiment, the element for interacting with the user is translatable.

For example, the fluid is a magnetorheological fluid, the stimulus being a magnetic field.

Another subject-matter of the present invention is a method for controlling a haptic interface according to the invention, comprising the following steps:
- determining the speed of the element for interacting with the user on the basis of the information provided by the means for measuring the current position on the element for interacting with the user,
- determining the torque or force applied to the element for interacting with the user,
- determining the current position of the element for interacting with the user,
- if the speed is greater than a given speed, the direction of rotation is that given by the speed and the system for generating a stimulus is controlled so as to apply the haptic pattern recorded for the current position determined and for the direction of rotation determined,
- if the speed is less than a given speed and if the torque or force is greater than a positive threshold value or less than a negative threshold value, the direction of movement of the element for interacting with the user is inferred from the torque or force determined, and the system for generating a stimulus is controlled so as to apply a stimulus according to the haptic pattern recorded for this current position and for the direction of movement inferred.

In the case where the torque or force determined is less than a given value, no stimulus can be applied to the fluid.

In one advantageous example of an embodiment wherein means are provided suitable for modulating the variable stimulus applied to the fluid according to the current position of the element for interacting with the user and the actuation speed of the element for interacting with the user, the control unit can comprise at least:
- a first database containing values of a first haptic pattern when the norm of the actuation speed is less than or equal to a first given value and is not zero and the element for interacting with the user is moved in the first direction,
- a second database containing values of a second haptic pattern when the norm of the actuation speed is at least equal to a second given value and the element for interacting with the user is moved in the first direction,
- a third database containing values of a third haptic pattern when the norm of the actuation speed is less than or equal to a third given value and is not zero and the element for interacting with the user is moved in the second direction,
- a fourth database containing values of a fourth haptic pattern when the norm of the actuation speed is at least equal to a fourth given value and the element for interacting with the user is moved in the first direction, and
- the means suitable for generating orders using according to the direction of actuation of the element for interacting with the user, the first and/or second databases or the third and/or fourth databases to determine a value of a new haptic pattern on the basis whereof an order is generated.

In a further example of an embodiment, the control unit can comprise at least:
- a first database containing values of a first haptic pattern when the norm of the actuation speed is less than or equal to a first given value and the element for interacting with the user is moved in the first direction,
- a second database containing values of a second haptic pattern when the norm of the actuation speed is at least equal to a second given value and the element for interacting with the user is moved in the first direction,
- a third database containing values of a third haptic pattern when the norm of the actuation speed is less than or equal to a third given value and the element for interacting with the user is moved in the second direction,
- a fourth database containing values of a fourth haptic pattern when the norm of the actuation speed is at least equal to a fourth given value and the element for interacting with the user is moved in the first direction, and
- the means suitable for generating orders using according to the direction of actuation of the element for interacting with the user, the first and/or second databases or the third and/or fourth databases to determine a value of a new haptic pattern on the basis whereof an order is generated.

Advantageously, the means generating the orders apply an interpolation, for example a linear interpolation, between a value of the first database and a value of the second database or between a value of the third database and a value of the fourth database.

For example, the second given speed can be defined as being the maximum actuation speed in the first actuation direction and the fourth given speed is defined as being the maximum actuation speed in the second actuation direction.

The means for determining the actuation speed can for example compute the derivatives of the information provided by the means for determining the current position.

In one example of an embodiment, the element for interacting with the user is rotatable and is secured to a rotary shaft the longitudinal axis whereof the element for interacting with the fluid is secured in rotation, the means for measuring the angular position comprise an angular position sensor.

In the case where the actuation speed of the element for interacting with the user is taken into account, the control means can comprise the following steps:
a) determining the current position of the element for interacting with the user,
b) determining the speed of the element for interacting with the user,
c) determining the direction of actuation,
d) determining, for the direction of actuation determined, a value of a haptic pattern for the actuation speed determined,
e) generating an order to the system for generating said stimulus.

During step d), the value of a haptic pattern can be determined on the basis of a first value of a haptic pattern for an actuation speed less than a first given value and not equal to zero and a second value of a haptic pattern for an actuation speed at least equal to a second given value.

For example, step d) is a step for computing said value of a haptic pattern for the actuation speed determined by means of a threshold function, the value of the pattern for the actuation speed determined being either the first value of a haptic pattern for an actuation speed less than a first given value, or the second value of a haptic pattern for an actuation speed at least equal to the second given value.

Advantageously, the method can comprise the step prior to step d) for determining the user's intended action on the element for interacting with the user. During step d), the value of a haptic pattern can be determined on the basis of a first value of a haptic pattern for an actuation speed less than or equal to a first given value optionally equal to zero and a second value of a haptic pattern for an actuation speed at least equal to a second given value.

Step d) can be a step for computing said value of a haptic pattern for the actuation speed determined by interpolation, for example by linear interpolation.

BRIEF DESCRIPTION OF THE FIGURES

The present invention will be understood more clearly on the basis of the following description and the appended figures wherein:

FIG. 1 is a longitudinal sectional view of an example of a haptic interface according to the invention, FIG. 2 is a transversal sectional view along the plane A-A of the interface in FIG. 1, FIG. 3 is a perspective view of an example of an embodiment of a proof body used in the interface in FIG. 1, FIG. 4 is a perspective view of a further example of an embodiment of a proof body that can be used in the interface in FIG. 1, FIG. 5 is a side view of a further example of a haptic interface, FIGS. 6A to 6C are different views of the proof body used in the interface in FIG. 5, FIGS. 7 and 8 represent examples of control algorithms of the haptic interface according to the invention.

DETAILED DESCRIPTION OF PARTICULAR EMBODIMENTS

Figure 7:
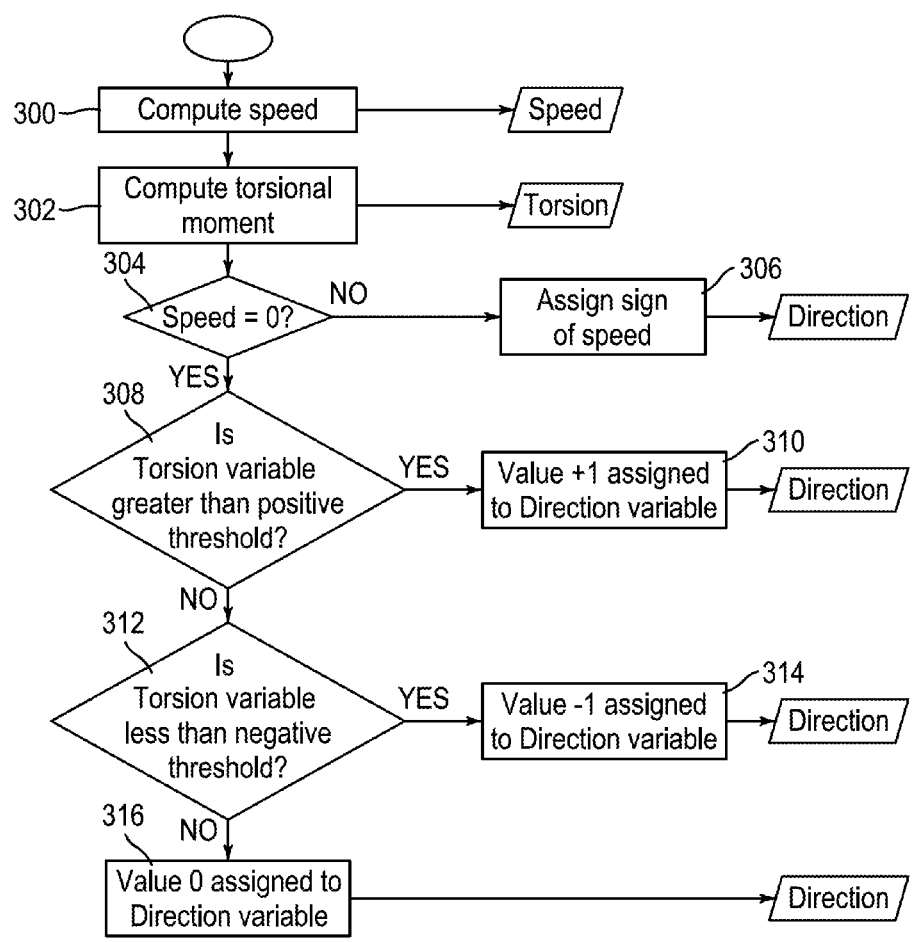

In the description hereinafter, the example of a haptic interface with a rotary button will be described in detail, but it will be understood that the invention is also applicable to a haptic interface with cursor type linear movement. This interface uses a magnetorheological fluid, i.e. the apparent viscosity whereof varies according to the magnetic field applied, but the use of an electrorheological fluid, i.e. a fluid wherein the apparent viscosity is dependent on the electrical field applied, is not outside the scope of the present invention.

In FIG. 1, a longitudinal sectional view of an example of an embodiment of a rotary haptic interface 11 according to the invention can be seen.

The haptic interface 11 comprises an element 1 intended to be operated by a user and which will be hereinafter referred to as "button", this button is secured in rotation with a shaft 2 rotatable about the axis X, and a resistant load generating device 4 or magnetorheological brake opposing the rotation of the shaft 2.

The brake 4 comprises a fluid the characteristics whereof can be modified by means of a magnetic field and a system for generating a magnetic field 6 received in a housing 8. The fluid is, for example, a magnetorheological liquid. The assembly comprising the housing, the fluid and the system for generating magnetic field forms a magnetorheological brake.

The housing 8 defines a tight chamber 9 containing the magnetorheological fluid. All or part of this chamber being subject to a magnetic field generated by the system 6. The housing 8 comprises a side wall 8.1, a bottom end 8.2 and a top end 8.3.

The shaft 2 traverses the top end 8.3, traverses the chamber 9 and traverses the bottom end 8.2. The end 2.1 of the shaft 2, opposite that supporting the button 1, is housed in the bottom end of the housing 8 and is guided in rotation by means of a bearing 11 mounted in the bottom end 8.2. Seals 13, for example O-rings, ensure the tightness between the shaft and the bottom and top ends.

The housing 8 defines a tight chamber confining the magnetorheological fluid.

The brake 4 also comprises an element 12 secured in rotation to the shaft 2 and housed in the tight chamber 10. This element is suitable for interacting with the magnetorheological fluid, the rotation of the element 12 being more or less braked by the magnetorheological fluid according to the apparent viscosity thereof.

In the example represented, the element 12 comprises two concentric side walls 12.1, 12.2 having a circular cross-section secured to a bottom 12.3, the bottom 12.3 being secured in rotation with the shaft.

Alternatively, the element 12 can only comprise one side wall or more than two concentric side walls. Also alternatively, the element 12 could be formed by a disk. Moreover, the interaction element could comprise slots and/or projecting or hollow portions in order to increase the resistance to movement.

In the example represented, the bottom end 8.2 of the housing 8 has a shape such that the internal volume of the tight chamber 9 has a shape corresponding to that of the interaction element 12, which makes it possible to reduce the quantity of fluid required. In the example represented, a cylindrical element 13 with a circular cross-section secured to the housing is inserted between the two side walls 12.1, 12.2, which contributes to the shearing effect of the magnetorheological fluid when the side walls 12.1 and 12.2 are rotated.

The side walls 12.1, 12.2 of the element 12 can be made of magnetic or a magnetic material.

In the example represented, the system for generating a variable magnetic field 6 comprises a coil secured to the housing and arranged inside the interaction element 12, and current power supply (not shown) controlled by a control unit according to the operation of the button and pre-recorded patterns.

The interface also comprises a position sensor 14 which is, in the example represented, situated outside the housing and partially secured to the shaft. The position sensor 14 makes it possible to measure the current position of the button, which is in the example represented by the current angular position. It can consist for example of an incremental optical encoder.

The haptic interface also comprises a frame 16 wherein the housing 8 is arranged. The frame 16 comprises a first and a second end flange 18, 20 and a side wall 22 secured to the two flanges 18, 20, the first flange 18 is traversed by the rotary shaft. The position sensor 14 is mounted on the first flange of the frame.

The interface also comprises means for detecting the user's intended action, these means thus detect the torque applied by the user before a movement of the button perceptible by the user and by the position sensor is applied thereon.

In the example represented, the means comprise a proof body 26 wherein the strain induced by the torque applied by the user and load sensors is to be detected. The proof body is represented on its own in FIG. 3. The proof body 26 is secured by a longitudinal end 26.1 to the frame 16 and by the other longitudinal end 26.2 to the magnetorheological brake, i.e. to the housing 8 in the example represented. The load sensors are in contact with the proof body at the longitudinal end 26.2 thereof secured to the housing 8.

In the example represented in FIGS. 1, 2 and 3, the proof body 26 comprises a body of cylindrical shape with a circular cross-section closed by a bottom 28 at the longitudinal end 26.2. An annular collar 30 extends radially outwards at the other longitudinal end 26.1.

The internal diameter of the proof body corresponds to the external diameter of the housing 8, increased by a functional clearance. The bottom of the proof body is arranged between the housing and the second flange 20 of the frame 16.

The proof body is secured to the frame by means of at least one screw 32 through the flange 18 and the collar 30. In the example represented, the screws 32 also serve to connect the flange 18 to the side wall 28.

The bottom 28 of the proof body is secured to the housing 8 by at least one screw 34.

The proof body 26 also comprises an element 36 protruding from the longitudinal end 26.2 thereof opposite that in contact with the housing. The element 36 is received in a cavity 38 formed in the flange 20 of the frame.

In the example represented, the protruding element 36 has the shape of an angular portion centred on the longitudinal axis. The angular portion 36 is defined by two faces 36.1, 36.2. The cavity 38 has a shape corresponding to that of the angular portion 36 and is defined by two faces 38.1 38.2 each facing one face 36.1, 36.2 of the angular portion 36. A load sensor 40.1 is mounted on the face 38.1 of the cavity in contact with the face 36.1 of the angular portion and a load sensor 40.2 is mounted on the face 38.2 of the cavity in contact with the face 36.2 of the angular portion 36. A point type mechanical contact is provided between each load sensor 40.1, 40.2 and the proof body 26. The load sensors 40.1, 40.2 are advantageously mounted pre-stressed.

As such, when a torque is applied to the button, the latter induces a torsional strain of the proof body 26 via the housing 8 which interacts with the fluid, the fluid interacting with the interaction element 12, the interaction element 12 being connected to the shaft 2. This strain is detected by one or the other of the load sensors 40.1, 40.2 according to the direction of rotation of the button.

The proof body is for example made of plastic material, such as ABS.

The material of the proof body and the geometry thereof can be determined according to the minimum torque and the maximum torque applied, the sensitivity of the load sensors and the detection threshold sought. Furthermore, the strain of the proof body is such that it is not perceptible by the user. For example, it can be considered that a strain of the proof body of a few microns is not perceptible by the user.

Alternatively, the loads could be measured directly on the housing 8 or on the rotary shaft, for this a torque sensor would be used. However, a torque sensor has a high cost and a significant size compared to force sensors. Moreover, a torque sensor provides a precise and calibrated torque value whereas this information is not useful within the scope of the invention.

The load sensor is for example embodied using piezoresistive elements assembled in the form of a Wheatstone bridge, they allow a sensitivity of the order of some tens of mV per Newton with a sufficiently high stiffness to limit the movement to some tens of microns at full load. Alternatively, the load sensor(s) could be replaced by one or more strain sensors formed, for example, by strain gauges directly applied to the proof body to detect the strain thereof.

In FIG. 4, a further example of a proof body 126 can be seen, the general shape whereof is identical to that of the proof body 26, but further comprises longitudinal slots 127 in the side wall of the proof body 126. Preferably, the slots 127 are distributed angularly in a regular fashion. The proof body exhibits in this embodiment a greater capacity for strain. It is for example made of aluminium alloy.

Slots inclined with respect to the longitudinal axis and/or having a shape other than rectilinear for example a curved shape are not outside the scope of the present invention. Moreover, the slots are not necessarily all the same size.

Advantageously, it is possible to envisage means for amplifying the strain of the proof body under an axial torsional strain while reducing the strain of the proof body for any other strain not relevant within the scope of the invention, such as for example a radial strain applied to the button parasitically by the user. The sensitivity of detection is thus improved and the disturbances or false detections can be eliminated.

The example of a proof body in FIGS. 1 to 4 makes it possible to increase the sensitivity of the measurement device by arranging the sensors over the greatest possible diameter.

In the example represented and advantageously, the walls 36.1 and 36.2 of the protruding element are arranged at 90° with respect to one another. This positioning associated with a point contact at the load sensors 40.1 and 40.2 makes it possible to break down the deformation strain of the proof body and give priority to the sensitivity to loads along two orthogonal components situated in the plane of the frame 16. As such, for example, the sensitivity is significantly reduced for parasitic loads applied perpendicularly to the plane of the frame 16. Furthermore, computational or algorithmic processing on the components of the orthogonal forces measured by the sensors 40.1 and 40.2, such as for example a computation based on the difference in measurement between the two sensors weighted by the common measurement components of the two sensors in the case of a preferential assembly of the sensors with load pre-stress, makes it possible to reduce to a certain degree the sensitivity to parasitic loads applied parallel with the plane of the frame 16.

An example of operation of the device will now be described.

The user turns the button about the axis thereof in a first direction of rotation and brings it to an angular position defined as a stop. A magnetic field is applied to the magnetorheological fluid such that the variation in apparent viscosity thereof generates a torque at the element for interacting with the fluid simulating a stop at the button in the first direction of rotation.

If the user holds the load on the button in the first direction of rotation, the proof body 26 is subjected to a torsional torque via the housing, the housing interacting with the fluid, the fluid interacting with the interaction element 12, the interaction element 12 being connected to the shaft 2.

This strain is measured by the force sensor arranged downstream in the first direction of rotation. Knowing which of the force sensors is actuated makes it possible to determine the direction wherein the user intends to turn the button. Preferentially, the measurements from the two force sensors assembled with load pre-stress can be combined to determine the direction wherein the user intends to turn the button. The detection of a minimum torque makes it possible to confirm that the user indeed intends to pivot the button. It is inferred that the user intends to hold the button at a stop. The magnetic field is maintained so as to oppose a load for the movement of the interaction element 12 via the viscous magnetorheological fluid.

If the user intends to pivot the button in a second direction opposite the first direction, the load sensor arranged upstream with respect to the first direction of rotation will be actuated. Preferentially, the measurements from the two force sensors assembled with load pre-stress can be combined to determine the new direction wherein the user intends to turn the button. The user's intention is inferred therefrom, this intention is confirmed by the detection of a minimum torque. In this case, the magnetic field is cancelled, the apparent viscosity of the fluid decreases significantly, the interaction element can thus rotate in the second direction without experiencing a sticking effect. As such, the operation of a free wheel can be reproduced by means of the invention.

In FIGS. 5 and 6A to 6C, a further example of an embodiment of an interface 12 according to the invention can be seen, comprising a frame 216, a brake 204, a proof body 226 having the shape of a wheel and an element for interacting with the user 201, the element for interacting with the fluid not being shown.

The wheel comprises a hub 228, an outer ring 232 and spokes 230 connecting the hub 228 to the outer ring 232.

In this example, the hub 228 is secured to the housing of the interface for example by screws axially traversing the hub 228 and the outer ring 232 is secured to the frame for example by screws axially traversing the outer ring.

Two load sensors 240.1, 240.2 are arranged bearing each against a spoke 230 and arranged with respect to the spokes such that, when the proof body 226 is actuated in one direction of rotation, only one of the sensors is actuated. The load sensors are mounted on the frame 216 and bearing against one face of a spoke 230. Alternatively, the load sensors could be assembled with a load pre-stress, or, as mentioned above, be replaced by elongation gauges arranged on the proof body and detecting the strain for example of the spokes under the effect of the torsional torque. More generally, the load sensors can be replaced by strain sensors.

The operation of this device is similar to that of the device in FIG. 1 described above.

Means for applying mechanical stress to the proof body, such as rotational or translational guiding means, can advantageously be added, which makes it possible to reduce the number of force sensors by assembling the latter with a load pre-stress.

The data obtained from these force or strain sensors are processed by an electronic system in order to determine whether the torque applied by the user to the interface exceeds a predetermined threshold. The torque sign is also determined and makes it possible to determine the direction wherein the user intends to move the button.

As mentioned above, knowledge of the actual value of the torsional torque is not required, knowledge of the direction of torsion is sufficient. It is thus possible to use low-cost sensors suitable for detecting at least a binary threshold or a monotonic function of the load or the strain, apart from any linearity, dynamic, resolution type specification, etc., insofar as the sensor is sufficiently sensitive to detect a minimum torque acting on the interface without there being any rotation thereof. The sensor is also such that it is capable of holding a maximum load without degradation.

Figure 9:
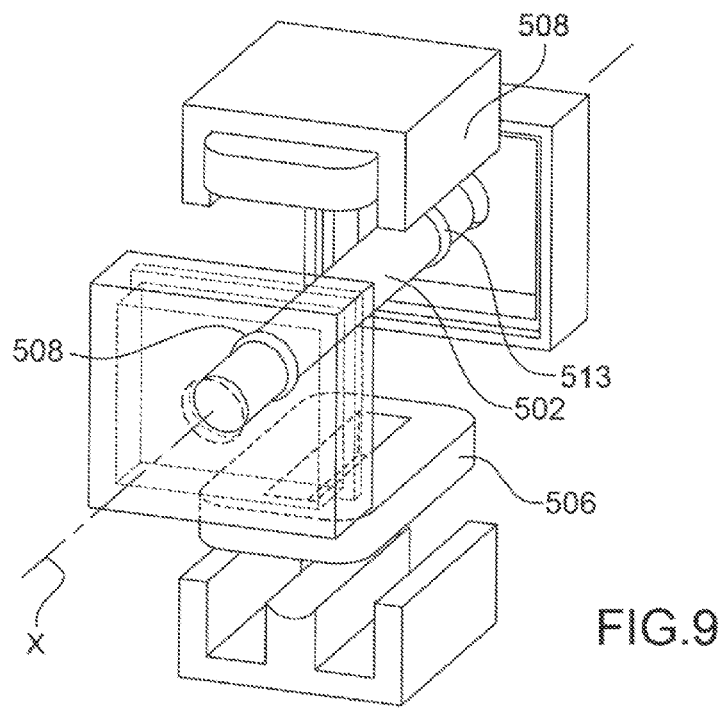
FIG. 9 is an exploded view of an example of a linear haptic interface according to the invention.

In FIG. 9, an exploded view of a schematically represented example of a linear haptic interface according to the invention can be seen.

The device comprises a housing 508 wherein is mounted a shaft 502 suitable for moving axially along the axis X thereof, the shaft 502 being intended to support an element for interacting with the user (not shown) at the level of at least one of the longitudinal ends thereof, means for generating a variable magnetic field 506 are arranged in the housing. The housing defines a tight chamber which contains magnetorheological fluid and which is traversed by the shaft 502. Seals 513 ensure tight sliding of the shaft in the chamber.

The interface also comprises a position sensor (not shown) suitable for measuring the current longitudinal position of the shaft 502.

The interface also comprises means for detecting the user's intended action, these means thus detect a translation force applied by the user to the shaft before a movement of the shaft perceptible by the user and by the position sensor is applied thereon. These means comprise a proof body (not shown), the strain whereof is measured by one or more force or strain sensors, the proof body being mounted on one hand on the housing and on the frame (not shown). If the user intends to move the shaft in the first direction of translation, the proof body is subjected to a shear force via the housing, in turn interacting with the fluid, in turn interacting with the interaction element, in turn connected to the shaft 502.

We shall now describe algorithms for operating the haptic interface such that the sensation perceived by the user when operating the button is consistent with the patterns recorded and offers improved haptic rendering. These algorithms are applied sequentially and periodically.

A haptic pattern is defined by a braking load to be applied which is dependent on the following data:
 the current angular position of the button,
 the current direction of rotation or the user's intended action to turn the button in one direction or in another,
 the current rotational speed of the button.

In the present case, we will focus particularly on the cases wherein the rotational speed of the button is zero or at least less than a value below which the movement of the button is considered to be imperceptible.

Control electronics jointly use the information of the angular position sensor and the information of the load sensors to determine the resistant torque to be generated by the brake 4.

The algorithm represented in FIG. 7 is applied to determine the direction of rotation wherein the button is turned.

The variables used are as follows:

The SPEED variable is the movement speed of the button.

The TORSION variable is an estimation of the torsional torque. Knowledge of the precise value of the torque is not required. This estimation is obtained on the basis of the information provided by the force sensor which is actuated by the proof body in the example of an embodiment in FIGS. 1 to 4. The estimation of the torsional torque makes it possible to determine whether the latter is greater or less than threshold values accounting for the direction wherein the torsional torque is applied.

The DIRECTION variable is the direction of actuation of the button, either it is equal to +1, it is equal to −1, or it is zero.

During a first step 300, the movement speed of the button is computed, for example by approximation of the derivative of the information provided by the angular sensor the information whereof is sampled at a determined temporal frequency Te, the SPEED variable is obtained.

The speed is considered to be zero when it is less than a given actual value and hence the approximation of the derivative of the information provided by the angular sensor sampled at a frequency Te returns to a zero value.

During a subsequent step 302, the estimation function of the torsional moment applied by the user is computed on the basis of the information provided by the load sensors, this function is the TORSION variable.

During a subsequent step 304, it is checked whether the SPEED variable is zero, if it is not zero, the sign of the speed is assigned to the DIRECTION variable (step 306).

If the SPEED variable is zero, the TORSION variable is used.

In a subsequent step 308; it is checked whether the TORSION variable is greater than a so-called "Positive threshold" threshold, if this is the case, the value +1 is assigned to the DIRECTION variable (step 310).

Otherwise, in a subsequent step 312, it is checked whether the TORSION variable is less than a so-called "Negative threshold" threshold, if this is the case, the value −1 is assigned to the DIRECTION variable (step 314).

Otherwise, i.e. if the speed is zero and the torsional torque is greater than the negative threshold and is less than the positive threshold, then, during a subsequent step 316, the DIRECTION variable adopts the value of zero. The system considers that no torque is applied to the button, it can for example be inferred therefrom that the user has released the button.

By means of this algorithm, it is possible to determine in the case where the movement speed of the button is zero the direction wherein the user intends to move the button without a significant movement thereof.

Indeed, it is possible by means of the information provided only by the force or strain sensor(s) to determine the direction wherein the torsional torque is applied, even without significant movement of the button, and therefore decide the direction wherein the user intends to move the button, and thus control the system for generating a variable magnetic field accordingly.

Alternatively, the rotational speed of the interaction element could be measured using a sensor specifically for measuring the rotational speed. This sensor can be for example mounted on the actuation shaft. This can consist for example of one or more optical sensors, one or more Hall effect sensors, one or more induction sensors, generating an output signal wherein the frequency is dependent on the rotational speed. Means are provided for converting the frequency to voltage. This voltage can then be measured by the control electronics to determine the rotational speed. It should be noted that speed sensors directly incorporating in the housing thereof the "frequency to voltage" conversion function can be used.

Sensors based on the use of the dynamo principle can also be used. They output an analogue quantity, generally a voltage, which is dependent on the rotational speed. This voltage can then be measured by the control electronics to determine the rotational speed.

Figure 8:
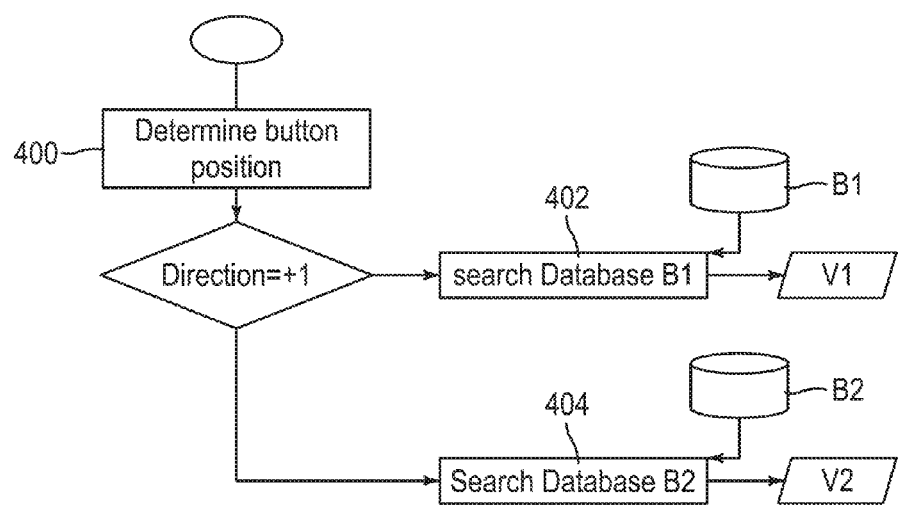

In a second algorithm represented in FIG. 8, the system subsequently determines which value of the haptic pattern it applies.

For each direction of actuation of the button, a haptic pattern is predetermined:
 a pattern M1 defined for the positive actuation direction of the button;
 a pattern M2 defined for the negative actuation direction of the button.

A pattern is in turn defined by a set of braking pattern values to be applied to the button. Each pattern value is associated with a specified angular position of the button.

These patterns are recorded in a database.

During a first step 400, the current position of the button is determined on the basis of the measurement provided by the current position sensor.

Then, if the value of the DIRECTION variable is equal to +1, a search will be conducted in the database B1 of the pattern M1 for the value V1 of the pattern associated with the current position of the button (step 402).

Otherwise, a search will be conducted in the database B2 of the pattern M2 for the value V2 of the pattern associated with the current position of the button (step 404).

It should be noted that the patterns M1 and M2 could be identical.

Then, the control electronics generate an order to the system for generating a magnetic field to apply the field corresponding to the pattern value of the pattern M1 or the pattern M2.

Let us consider that the user turns the button in a positive direction and enters the zone defined as a stop, the system applies the pattern reproducing a stop in a known manner.

The user cannot move the button in the positive direction, the system then detects a zero speed in this position.

It applies the first algorithm which, on the basis of the torsional torque, determines the direction wherein the user intends to turn the button (DIRECTION variable).

On the basis of this knowledge of the direction of actuation of the button, the system applies the second algorithm and determines the pattern to be applied and, on this basis, controls the system for generating a magnetic field.

If the direction is positive, the stop pattern should be maintained and the application of the sufficient magnetic field for simulating the stop is maintained.

If the direction is negative, the pattern corresponding to the negative direction is reproduced, for example the magnetic field is reduced or cancelled. As the magnetic field is modified before the user has even perceptibly moved the button, he/she perceives no sticking sensation.

The invention also has the effect of removing this sticking sensation in the case where, in a given current position of the button, the patterns M1 and M2 are different and the user changes direction of rotation. When changing direction of rotation, the speed detected is zero and the first and second algorithms are applied in the same way.

It should be noted that the algorithms are run continuously in order to continuously determine the value of the pattern to be reproduced and continuously adapt the apparent viscosity of the fluid in order to attain this pattern value.

The invention also makes it possible to detect when the user has released the button and it is no longer necessary to apply a magnetic field to simulate a sensation, this is detected when the DIRECTION variable=0. In this case, the electricity consumption in the coil can be switched off.

The invention further makes it possible either to reduce the electricity consumption of the device by interrupting the generation of a magnetic field when not required, or at equal consumption to apply a very strong magnetic field for a short time to simulate a strong stop, in this case coil is preferably small in size.

Moreover, the invention makes it possible to detect when the user has taken hold of the button once again by detecting the re-application of a torque on the button and detect the direction wherein the user intends to move the button and thus control the system for generating a magnetic field such that, when the user moves the button perceptibly, he/she perceives the haptic sensation without delay.

The order of magnitude of the reaction time of the device is a few milliseconds.

In the case of a button with cursor type linear movement, a translation force is determined. Otherwise, the algorithm is identical to that described for a rotary button.

The information obtained by the force or strain sensors can be used by the system for other purposes. For example, it can be used to determine whether a user is voluntarily forcing on the button to try to pass a stop. The button could then report information to a monitoring system indicating this "error".

By means of the invention, a haptic interface is produced offering very satisfactory haptic rendering by substantially reducing the sticking sensation, or even eliminating same and improving the reactivity of the interface. Furthermore, the haptic interface can have a reduced electricity consumption.

In a very advantageous example, the detection of the user's intended action can also be associated with accounting of the value of the actuation speed of the button, in addition to the movement direction, in order to generate the order to the system for generating a magnetic field.

For this, four patterns are defined:
 a pattern MPL defined for the direction of actuation considered to be positive of the button and for a low rotational speed;
 a pattern MPR defined for the positive direction of actuation of the button and for a high rotational speed;

a pattern MNL defined for the direction of actuation considered to be negative of the button and for a low rotational speed;

a pattern MNR defined for the negative direction of actuation of the button and for a high rotational speed.

The low speed is a speed for which the value is less than or equal to a given threshold but is not zero.

The high speed is considered to be the maximum speed with which the button can be actuated. The high speed in the positive direction can be equal or different to the high speed in the negative direction.

The actuation speed is advantageously approximated on the basis of the information provided by the position sensor, which makes it possible to offer a compact system. Nevertheless, any other device distinct from the position sensor could be used to determine the rotational speed.

Figure 10:
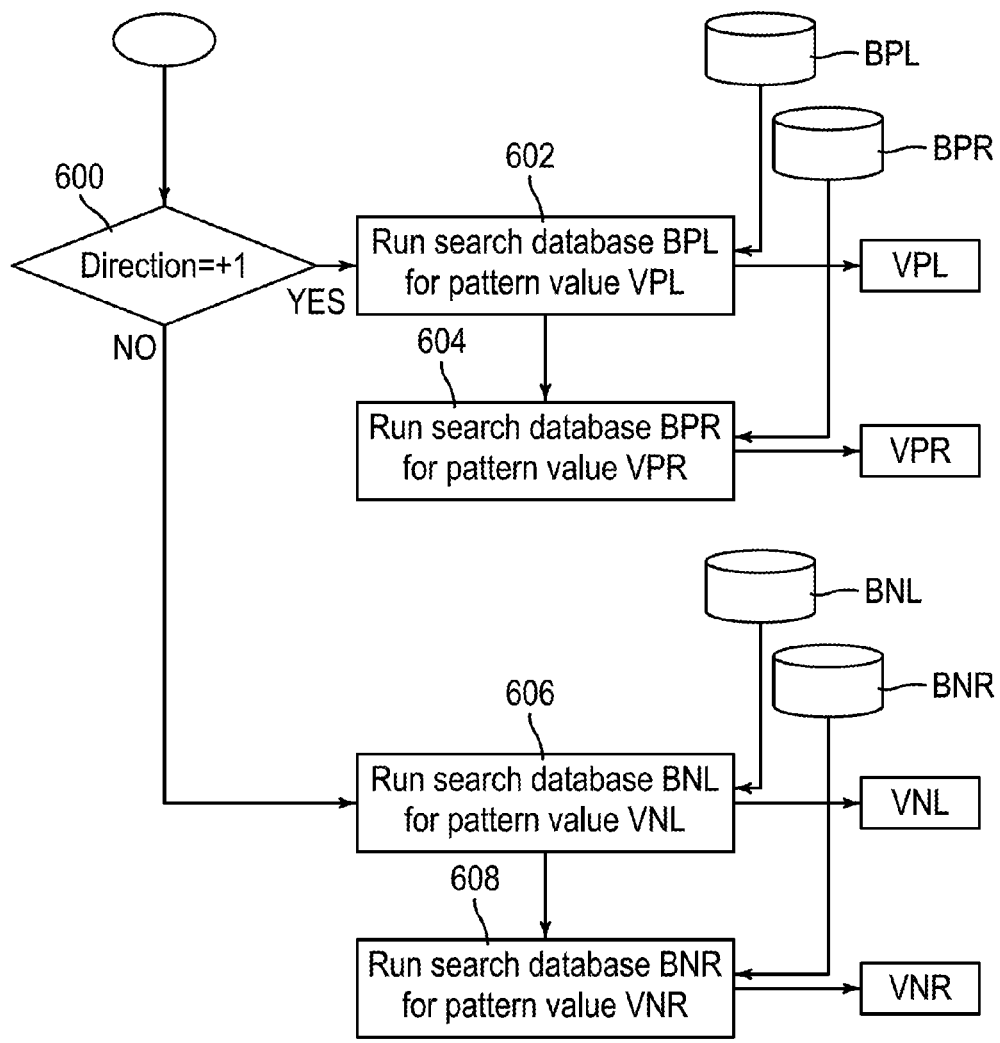
FIGS. 10 and 11 represent further examples of control algorithms of an advantageous example of the haptic interface.

In FIG. 10, a first algorithm for selecting the choice of pattern values to be taken into account is represented.

During a first step 600, the position of the button, the actuation speed (SPEED variable) and the actuation direction (DIRECTION variable) are determined on the basis of the information provided by the current position sensor. The DIRECTION variable can adopt the value +1 (movement direction considered to be positive), the value −1 (movement direction considered to be negative) or the value 0 when the speed is zero.

If the DIRECTION variable is equal to +1, then:
a search will be run in the low-speed positive pattern database BPL for the pattern value VPL (step 602), and
a search will be run in the high-speed positive pattern database BPR for the pattern value VPR (step 604).

The steps 602 and 604 can be simultaneous or sequential.

Otherwise, i.e. if the DIRECTION variable is equal to −1 or 0, then:
a search will be run in the low-speed negative pattern database BNL for the pattern value VNL (step 606), and
a search will be run in the high-speed negative pattern database BNR for the pattern value VNR (step 608).

At the end of the first algorithm process, two pattern values are obtained, either VPL and VPR, or VNL and VNR.

Figure 11:
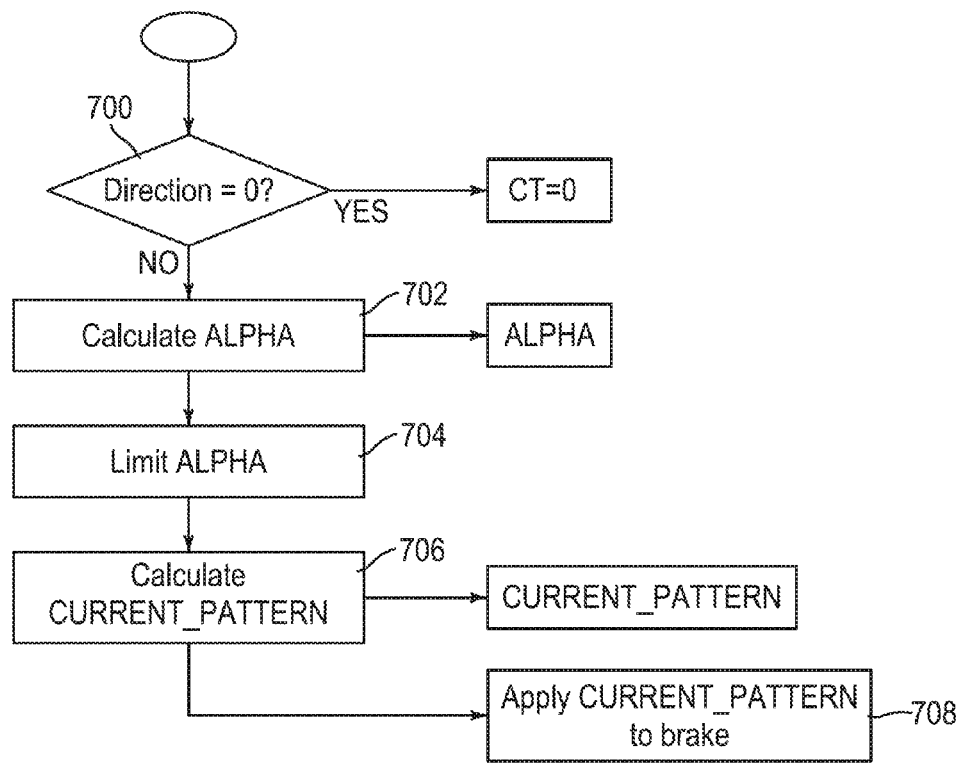

In FIG. 11, an advantageous example of a second algorithm suitable for determining the braking load or the current intensity, the latter being considered to be proportional, to be applied to the system for generating a magnetic field, can be seen.

During a first step 700, it is checked whether the DIRECTION variable is equal to 0, if this is the case, in this example the control unit generates an order to the brake not to apply any load to the button, i.e. no magnetic field is applied to the fluid. The algorithm is completed. Alternatively, it could be decided to keep the last magnetic field applied. This step could take place before the step 702.

If the DIRECTION variable is different to 0, i.e. if it is equal to +1 or −1 then, during a subsequent step 702, the coefficient ALPHA is computed which is equal to:

$$(abs(SPEED) - V\_MIN)/(V\_MAX - V\_MIN).$$

where abs(SPEED) is the absolute value of the SPEED variable, where V_MAX is the set value of the maximum actuation speed, this value is set for example to the usual maximum rotational speed with which a user usually actuates the button when seeking to make quick and rough movements with the interface.

where V_MIN is the set value of the minimum actuation speed, this value is set for example to the usual minimum rotational speed with which a user usually actuates the button when seeking to make slow and precise movements with the interface.

V_MAX corresponds to the high speed at which the patterns MPR and MNR are established without correction.

V_MIN corresponds to the low speed at which the patterns MPL and MNL are established without correction.

During a subsequent step 704, the coefficient ALPHA is advantageously limited between 0 and 1 to prevent aberrant computation results, indeed it can arise that, exceptionally, the button is actuated at a speed greater than the maximum speed set, i.e. that the computation of the value ALPHA gives a result greater than 1 since nothing is limiting the actuation speed mechanically. Similarly, it can arise that, exceptionally, the button is actuated at a speed less than the minimum speed set, i.e. that the computation of the value ALPHA gives a result less than 0 since it is possible to choose a value different to zero for V_MIN.

During a subsequent step 706, the CURRENT_PATTERN variable is computed using a linear interpolation on the basis of the pattern values selected by the first algorithm.

CURRENT_PATTERN=(1-ALPHA)*VPL+ALPHA*VPR if the actuation direction is positive or
CURRENT_PATTERN=(1-ALPHA)*VNL+ALPHA*VNR if the actuation direction is negative.

During a subsequent step 708, the CURRENT_PATTERN variable is applied to the brake.

Figure 12:
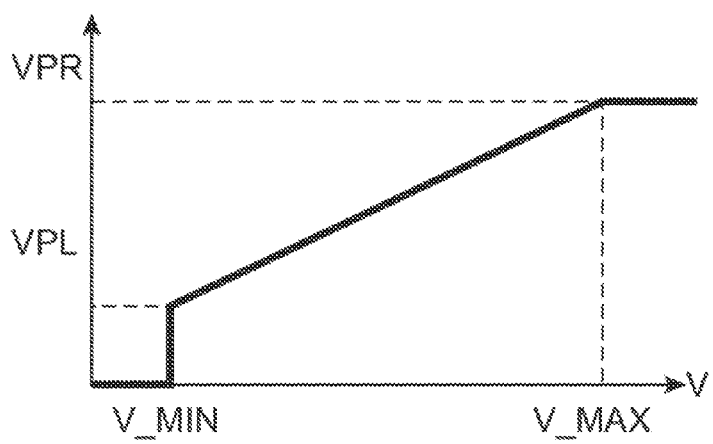
FIG. 12 is a graphic representation of the braking level applied by the magnetorheological brake according to the actuation speed of the element for interacting with the user.

In the algorithm in FIG. 11, the CURRENT_PATTERN is computed on the basis of a linear interpolation. In FIG. 12, a representation of this pattern according to the actuation speed in the case of an actuation in the positive direction can be seen.

Any other interpolation, for example a quadratic interpolation, can be used.

It can also be envisaged to use a threshold function, the CURRENT_PATTERN adopting one value for a speed less than or equal to a threshold value and adopting another value for a speed greater than the threshold value.

In the algorithm in FIG. 11, the braking load is accentuated with the actuation speed in the case of the selection of VPR>VPL (or VNR>VNL respectively for the other actuation direction).

It can on the other hand be envisaged that the braking load decreases whereas the actuation speed increases or that the relationship between the CURRENT PATTERN and the speed is not monotonic.

The algorithms described above are fully applicable to a linear haptic interface, the position sensor would then determine longitudinal positions and not angular positions.

The haptic interface according to the invention is particularly suitable for an application in motor vehicles, for example to form an onboard haptic interface assisting the motor vehicle driver. It can assist the user in interacting with the various vehicle equipment or accessories such as the GPS (Global Positioning System), radio, air conditioning, etc.

The invention claimed is:

1. A haptic interface, comprising:
   a user interaction element interacting with a user and configured to move in a first direction and in a second direction;
   a fluid interaction element interacting with a fluid, viscosity whereof varies according to an external stimulus, the fluid interaction element being secured at least in translation or at least in rotation with the user interaction element;

a current position sensor to measure a current position of the user interaction element;

a brake comprising a fluid, viscosity whereof varies according to an external stimulus, and a generation system to generate the stimulus on command in the fluid, the fluid interaction element being arranged in the fluid;

a control circuitry configured to generate orders to the system to generate the stimulus to modify the stimulus value; and a torque sensor to detect torque applied by a user on the user interaction element, and in a case of a rotatable user interaction, to determine direction of the torque and whether the torque is greater than a given value for a given direction, the control circuitry to control the generation system to generate the stimulus based on information obtained on the torque at least when a zero or low speed of the user interaction element is detected; or a load sensor to detect load applied by a user on the user interaction element, and in a case of a translatable user interaction element, to determine direction of the force and whether the force is greater than a given value for a given direction, the control circuitry to control the generation system to generate the stimulus based on information obtained on the force at least when a zero or low speed of the user interaction element is detected.

2. A haptic interface according to claim 1, wherein the torque sensor or the load sensor comprises at least one load sensor, mounted pre-stressed.

3. A haptic interface according to claim 2, wherein the torque sensor or the load sensor comprises first and second load sensors, configured such that the first load sensor detects a load when the torque or force is applied in the first direction and the second load sensor detects a load when the torque or force is applied in the second direction.

4. A haptic interface according to claim 1, wherein the torque sensor or the load sensor comprises at least one strain sensor to measure strain induced by the torque or load to one of the elements of the haptic interface.

5. A haptic interface according to claim 4, wherein the torque sensor or the load sensor comprises at least a first strain sensor and a second strain sensor to measure strain induced by the torque or load on one of the elements of the haptic interface, wherein the first strain sensor detects strain when the torque or force is applied in the first direction and the second strain sensor detects strain when the torque or force is applied in the second direction.

6. A haptic interface according to claim 1, further comprising a proof body configured to be strained by the torque or load applied by the user to the user interaction element, the torque sensor or the load sensor being in contact with the proof body.

7. A haptic interface according to claim 6, wherein the proof body is made of a material such that strain thereof is not perceptible by the user.

8. A haptic interface according to claim 2, further comprising a proof body configured to be strained by the torque or load applied by the user to the user interaction element, the torque sensor or the load sensor being in contact with the proof body and wherein the load sensor is in point contact with the proof body.

9. Haptic interface according to claim 8, wherein the proof body is made of a material such that strain thereof is not perceptible by the user.

10. A haptic interface according to claim 6, further comprising a frame whereon are mounted the torque sensor or the load sensor, the proof body being secured to the brake and secured to the frame to be strained when a torque or force is applied to the user interaction element.

11. A haptic interface according to claim 2, further comprising a proof body configured to be strained by the torque or force applied by the user to the user interaction element, the torque sensor or the load sensor being in contact with the proof body, and wherein the load sensor or the strain sensor is configured with respect to the proof body such that measurement sensitivity of the load sensor with respect to the torque or the load is maximized.

12. A haptic interface according to claim 1, wherein the user interaction element is rotatable and is connected to a rotary shaft with a longitudinal axis whereof the fluid interaction element is secured in rotation, the rotational torque being determined.

13. A haptic interface according to claim 11, wherein the user interaction element is rotatable and is secured to a rotary shaft the longitudinal axis whereof the fluid interaction element is secured in rotation, the rotational torque being determined, and wherein the brake comprises a cylindrical housing having a circular cross-section coaxial with the axis of the rotary shaft, the proof body being cylindrical with a coaxial circular cross-section and arranged coaxially about the housing, and wherein the load sensor or the strain sensor is arranged on a circle centered on the axis of rotation of the rotary shaft.

14. A haptic interface according to claim 1, wherein the user interaction element is translatable.

15. A haptic interface according to claim 1, wherein the fluid is a magnetorheological fluid, the stimulus being a magnetic field.

16. A method for controlling a haptic interface according to claim 1, comprising:

determining speed of the user interaction element based on the information provided by the current position sensor on the user interaction element;

determining the torque or force applied to the user interaction element;

determining the current position of the user interaction element;

if the speed is greater than a given speed, the direction of rotation is that given by the speed and the system for generating a stimulus is controlled to apply the haptic pattern recorded for the current position determined and for the direction of rotation determined, if the speed is less than a given speed and if the torque or load is greater than a positive threshold value or less than a negative threshold value, the direction of movement of the element for interacting with the user is inferred from the torque or force determined, and the system for generating a stimulus is controlled to apply a stimulus according to the haptic pattern recorded for this current position and for the direction of movement inferred.

17. A method according to claim 16, wherein when the torque or load determined is less than a given value, no stimulus is applied to the fluid.

* * * * *